United States Patent
Cross

[19]

[11] Patent Number: 5,975,007
[45] Date of Patent: Nov. 2, 1999

[54] COMBINED WHISTLE AND ENVIRONMENTAL INSTRUMENTS

[75] Inventor: Gregory L. Cross, Arvada, Colo.

[73] Assignee: Sun Company, Inc., Arvada, Colo.

[21] Appl. No.: 08/967,005

[22] Filed: Nov. 10, 1997

[51] Int. Cl.[6] ................................................. G01K 5/00
[52] U.S. Cl. ..................... 116/137 R; 446/204; 446/404; 362/253; 374/141; 368/10; 73/29.02
[58] Field of Search ................................ 116/137 R, 200, 116/DIG. 44, 2; 446/204–206, 216, 404; 84/330; 362/119, 253; D10/119, 120; 33/333, 334; 374/141; 368/10; 73/23.2, 29.01, 29.02, 335.01

[56] References Cited

U.S. PATENT DOCUMENTS

| | | | |
|---|---|---|---|
| 3,085,150 | 4/1963 | Bautsch | 446/204 |
| 3,919,782 | 11/1975 | Vaucher | 33/349 |
| 4,314,316 | 2/1982 | Gertler et al. | 362/253 |
| 4,359,961 | 11/1982 | Seron | 116/137 R |
| 4,449,474 | 5/1984 | Mariol | 116/137 R |
| 5,002,006 | 3/1991 | Ehrenreich | 116/137 R |
| 5,251,569 | 10/1993 | Seron | 116/137 R |
| 5,450,298 | 9/1995 | Fells et al. | 362/139 |
| 5,578,992 | 11/1996 | Harding | 362/253 |

FOREIGN PATENT DOCUMENTS

| | | | |
|---|---|---|---|
| 1309168 | 10/1962 | France | 116/137 R |

*Primary Examiner*—Andrew Hirshfeld
*Attorney, Agent, or Firm*—Klaas, Law, O'Meara & Malkin, P.C.; Joseph J. Kelly, Esq.; William P. O'Meara, Esq.

[57] ABSTRACT

A whistle designed particularly for outdoor use, such as in hiking or camping, wherein opposite sidewalls of the whistle are provided with openings having inwardly directed flanges so that closure devices may be press fitted therein and wherein the closure devices preferably comprise a compass, a thermometer or a molded disk, but can also comprise other environmental instruments.

7 Claims, 1 Drawing Sheet

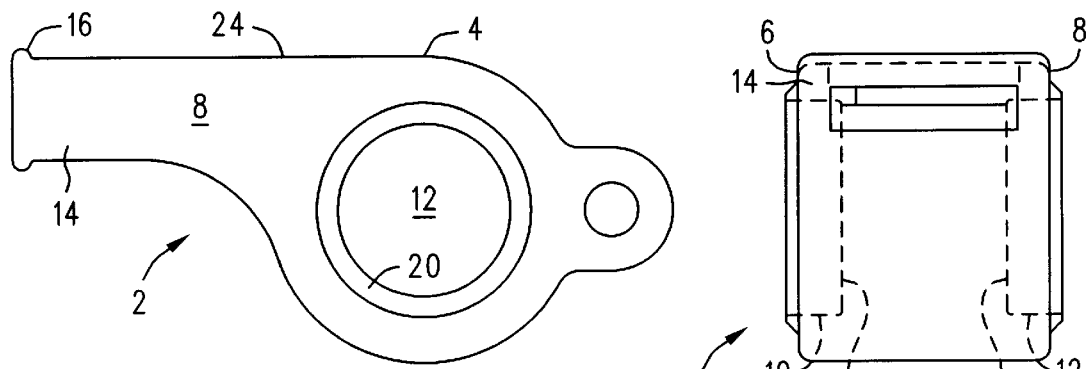
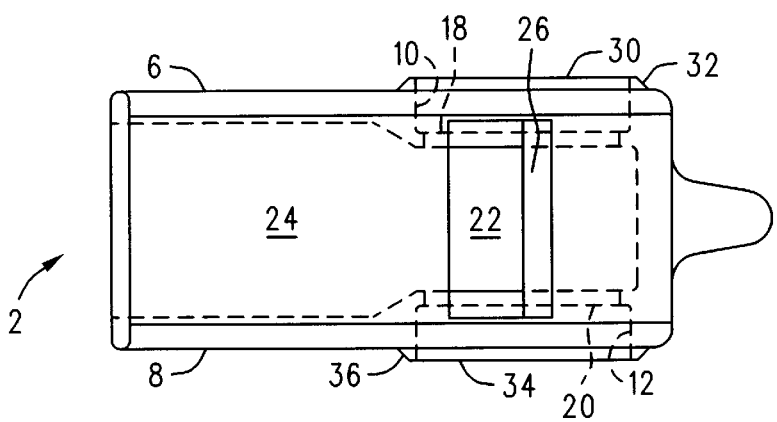
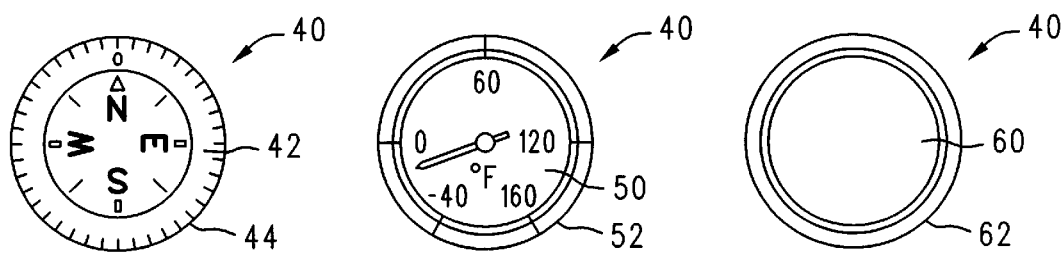
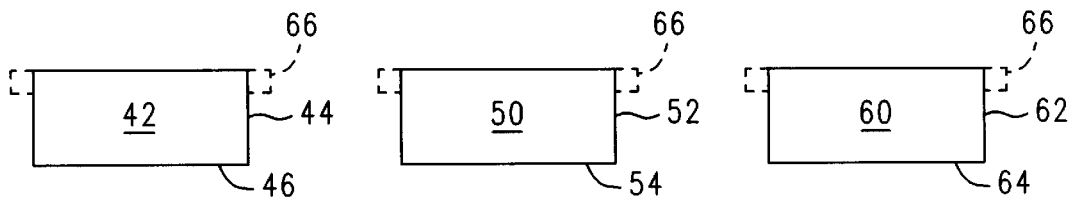

COMBINED WHISTLE AND ENVIRONMENTAL INSTRUMENTS

FIELD OF THE INVENTION

This invention relates generally to devices particularly suited for outdoor use, such as in hiking or camping, and more particularly to a whistle that has one or more environmental instruments incorporated therewith.

BACKGROUND OF THE INVENTION

There are many uses of a whistle when people are using the outdoors for various reasons, such as hiking or camping. The whistle can be used by one group to indicate its position to another group. In case of emergency, the whistle can be used to signify a need for assistance. In some instances, a compass is desired to follow a direction to reach a desired location. Another environmental instrument desired for use in hiking and camping is a thermometer to indicate conditions that may require certain precautions. While all these environmental instruments are well known and generally available, they are generally carried as separate environmental instruments and can be misplaced or lost.

BRIEF DESCRIPTION OF THE INVENTION

This invention provides a combination of a whistle having an opening provided in each of its opposite sidewalls so that closure devices may be press fitted or otherwise secured therein. The closure devices preferably comprise a molded disk and an environmental instrument, such as a compass or a thermometer, or both of the environmental instruments.

In a preferred embodiment of the invention, there is provided a whistle having a hollow housing having opposite sidewalls with each of the opposite sidewalls having an opening formed therein. Each of the openings has an inwardly directed flange formed therein so that a closure device may be press fitted therein to close each opening after a conventional ball has been inserted into the hollow housing. In accordance with the invention at least one of the closure devices comprises an environmental instrument which is taken from a group comprising a compass, a thermometer, a flashlight, a clock, a signal mirror, or a hygrometer. In preferred embodiments of the invention, the closure devices comprise: a molded disk and a compass; a molded disk and a thermometer; or a compass and a thermometer.

BRIEF DESCRIPTION OF THE DRAWING

Illustrative preferred embodiments of the invention are illustrated in the drawing in which:

FIG. 1 is a side elevational view of a whistle;

FIG. 2 is an end elevational view taken from the left side of FIG. 1;

FIG. 3 is a top plan view of FIG. 1;

FIG. 4. Is a top plan view of one of the closure devices of this invention;

FIG. 5 is a side elevational view of FIG. 4;

FIG. 6 is a top plan view of another of the closure devices of this invention;

FIG. 7 is a side elevational view of FIG. 6;

FIG. 8 is a top plan view of another of the closure devices of this invention; and FIG. 9 is a side elevational view of FIG. 8.

DETAILED DESCRIPTION OF THE INVENTION

In FIGS. 1–3 there is illustrated a whistle 2 having a hollow housing 4 having opposite sidewalls 6 and 8. The sidewall 6 has an opening 10 formed therein and the sidewall 8 has an opening 12 formed therein. The openings 10 and 12 have substantially the same diameter. The whistle 2 has a relatively elongated hollow stem portion 14 having an abutment surface 16 for placement into the mouth of the user to blow air therethrough. The opening 10 has an inwardly projecting flange 18 and the opening 12 has an inwardly projecting flange 20 for purposes described below. An opening 22 is formed in the upper surface 24 of the hollow housing 4 and has an inclined surface 26 adjacent thereto.

The sidewall 6 has a raised surface 30 surrounding the opening 10, projecting outwardly therefrom and having an inclined surface 32. The sidewall 8 has a raised surface 34 surrounding the opening 12, projecting outwardly therefrom and having an inclined surface 36.

In FIGS. 4–9, there are illustrated various types of closure devices 40 that are to be inserted into one of the openings 10 and 12 as described below. The compass 42 has a conventional magnetic needle to indicate North. It may also have a rotatable bezel ring for taking directional bearings. It may also include a dial showing N, S, E and W as or affixed to the top of the magnetic needle.

In FIGS. 4 and 5, there is illustrated a compass 42 as the closure device 40. The compass 42 has a sidewall 44 having a diameter only slightly smaller than the diameter of either of the openings 10 and 12. The compass 42 has a bottom surface 46 a portion of which contacts the flange 18 or 20 when it is positioned in one of the openings 10 or 12 as described below.

In FIGS. 6 and 7, there is illustrated a thermometer 50 as the closure device 40. The thermometer 50 has a sidewall 52 having a diameter only slightly smaller than the diameter of either of the openings 10 and 12. The thermometer 50 has a bottom surface 54 a portion of which contacts the flange 18 or 20 when it is positioned in one of the openings 10 or 12 as described below.

In FIGS. 8 and 9, there is illustrated a molded disk 60 as the closure device 40. The molded disk 60 has a sidewall 62 having a diameter only slightly smaller than the diameter of either of the openings 10 and 12. The molded disk 60 has a bottom surface 64 a portion of which contacts the flange 18 or 20 when it is positioned in one of the openings 10 or 12 as described below.

A closure device 40 may be positioned in one of the openings 10 or 12 on a permanent basis or a removable basis.

On a permanent basis, the diameters of the openings 10 or 12 and of the sidewalls 44, 52, or 62 are dimensioned so that a closure device 40 can be inserted into one of the openings 10 or 12 and its bottom surface 46, 54, or 64 moved into contact with the flange 18 or 20 and secured therein by securing means, such as an adhesive.

On a removable basis, the diameter of the openings 10 or 12 and of the sidewalls 44, 52 or 62 are dimensioned so that a closure device 40 can be inserted into one of the openings 10 or 12 and its bottom surface 46, 54 or 64 moved into contact with the flange 18 or 20 with the application of sufficient force to obtain a press fit to hold the closure device 40 in one of the openings 10 or 12, but to permit the removal thereof by the application of a sufficient force.

In one embodiment of the invention, the closure device 40 can be removed by inserting a tool through the opening 22 and applying a force to the bottom surface 46, 54 or 64 of the closure device 40. In another embodiment of the invention, the closure device 40 can be provided with an outwardly projecting flange 66 to provide a space between the flange 66 and the inclined surface 32 or 36 into which a tool can be inserted to apply a force on the closure device 40.

It is contemplated that the inventive concepts herein described may be variously otherwise embodied and it is intended that the appended claims be constructed to include alternative embodiments of the invention except insofar as limited by the prior art.

What is claimed:

1. A whistle comprising:

a hollow housing having opposite sidewalls and a stem portion having one end portion for placement into the mouth of a user to blow air therethrough;

each of said sidewalls having an opening formed therein to form an open ended hollow cavity at another end portion of said stem portion;

each of said openings having a flange portion at an inner portion thereof;

a closure device inserted into each opening to close each of said openings so as to form a sounding chamber for said whistle wherein at least one of said closure devices comprises an environmental instrument and is positioned within its respective opening.

2. A whistle as in claim 1 wherein:

said environmental instrument comprises a compass.

3. A whistle as in claim 2 wherein:

the other of said closure devices comprises a molded disk.

4. A whistle as in claim 1 wherein:

said environmental instrument comprises a thermometer.

5. A whistle as in claim 4 wherein:

the other of said closure devices comprises a molded disk.

6. A whistle as in claim 1 wherein:

the other of said closure devices also includes an environmental instrument.

7. A whistle as in claim 1 wherein:

said environmental instrument comprises a compass; and the other of said closure devices comprises a thermometer.

* * * * *